Patented Sept. 23, 1930

1,776,308

UNITED STATES PATENT OFFICE

JAMES BRIGHTMORE, OF TIDESWELL, ENGLAND

FIXATION OF ATMOSPHERIC NITROGEN

No Drawing. Application filed June 23, 1927, Serial No. 201,034, and in Great Britain July 6, 1926.

This invention relates to the fixation of atmospheric nitrogen and the production of nitrates, and consists primarily in subjecting preheated atmospheric air, and superheated steam, while under pressure in a closed chamber, to the action of direct or alternating electric current in the presence of suitable lime compounds, preferably a mixture of hydrate of lime and carbonate of lime, the latter preferably in the form of calc spar, both the lime and spar being in a dry state and reduced to a fine powder or flour. It is found also that the reactions are facilitated or promoted by the presence of a catalyst.
The process may be carried out in one or two stages, the superheated steam being omitted in the second stage which may be regarded as supplementary but only essential where it is desired to obtain a very high percentage of nitrogenous content. The nitrogenous content may also be supplemented by the use of the electric arc flame and this may be employed in lieu of or in addition to the second stage of the treatment aforementioned.
The mixture of hydrate of lime and carbonate of lime is first placed in a closed chamber where it is wholly or partially converted into nitrate of calcium by the action of preheated air, superheated steam and an electric current of suitable strength and pressure, the mixture being afterwards further subjected while in a state of agitation to a stronger electric current in the presence of hot and/or cold air currents. For the reasons stated the reactions should be effected in the presence of a catalyst.

In one way of carrying out the invention, hydrated lime together with an admixture of one tenth of its bulk of calc spar, both reduced in a dry state to a fine state of sub-division by grinding or other means, are placed in a closed chamber to which superheated steam and preheated air are admitted under pressure of 4 to 5 atmospheres. The hot air at a temperature of 900° F. provides the requisite nitrogen at a suitable temperature for combining with the oxygen of the superheated steam and air under the action of direct or alternating electric current of 30 amperes applied to suitable electrodes at a pressure of 80 volts the steam condenses in the powdered lime compound and hence moistens the same so that it becomes a conductor through which the electric current can readily pass. At the same time ionizing of the mixed material takes place and thus in this first stage there is produced an active base in a condition for readily combining with the oxides of nitrogen and/or nitric acid formed. After continuing this treatment for a period of time depending upon the bulk of the mass under treatment usually about 3 hours, the materials are transferred to another chamber, the lower half of which is preferably lead lined and below ground level, where they are subjected alternately to currents of hot and cold air introduced under pressure of 4 to 5 atmospheres, the hot air being at a temperature of 900° F. At the same time more powerful electrical currents of 40 amperes at a pressure of 90 volts from a dynamo generator are passed through the materials which are kept in a state of agitation by the flow of air through the mass. This treatment is continued as long as required, the period varying with the quantity of material treated, but as a rule should not exceed 3 hours or thereabouts for economic working.

In both stages of the process the combination of the nitrogen and oxygen is facilitated as aforesaid by the presence of a catalyst. In the first stage I employ copper and zinc plates as catalysts and in the second stage nickel and copper coils. The said catalysts may also be connected with the electric leads and serve as electrodes.

In some cases in order to increase or enrich the nitrogenous contents, a compressed air blast is passed first through an electric arc flame and then through a jet or spray of water on to the prepared material to combine therewith and form nitrates.

I claim:—

1. The improved process for the fixation of atmospheric nitrogen and the production of nitrates consisting in subjecting preheated air and superheated steam while under pressure in a closed chamber to the action of direct or alternating electric current in the presence of a powdered lime compound and a catalyst.

2. A process for the fixation of atmospheric nitrogen and the production of nitrates, wherein a powdered lime compound is placed in a closed chamber and wholly or partially converted under pressure into nitrate of calcium by the action of preheated air, superheated steam and an electric current.

3. A process according to claim 1 wherein the nitrogenous content is supplemented by the use of an electric arc flame substantially as described.

In testimony whereof he has affixed his signature.

JAMES BRIGHTMORE.